United States Patent

Jennings, Jr.

[15] 3,701,048
[45] Oct. 24, 1972

[54] MULTI-ROD SINGLE PUMP SOURCE LASER

[72] Inventor: Walter B. Jennings, Jr., Huntsville, Ala.

[73] Assignee: The United States of America as represented by the Secretary of the Army

[22] Filed: Sept. 15, 1967

[21] Appl. No.: 668,246

[52] U.S. Cl. .................................................331/94.5
[51] Int. Cl. .................................................H01s 3/09
[58] Field of Search .....................................331/94.5

[56] References Cited

UNITED STATES PATENTS 3,311,844  3/1967  Di Curcio.................331/94.5
3,408,937  11/1968  Lewis et al................102/70.2

Primary Examiner—Ronald L. Wibert
Assistant Examiner—R. J. Webster
Attorney—Harry M. Saragovitz, Edward J. Kelly, Herbert Berl and Aubrey J. Dunn

[57]   ABSTRACT

A device for achieving laser output at a high repetition frequency wherein a plurality of laser rods are pumped by a singular source and the output beams of the laser rods are directed in substantially the same path.

2 Claims, 3 Drawing Figures

PATENTED OCT 24 1972　　3,701,048
Walter B. Jennings, Jr.,
INVENTOR.
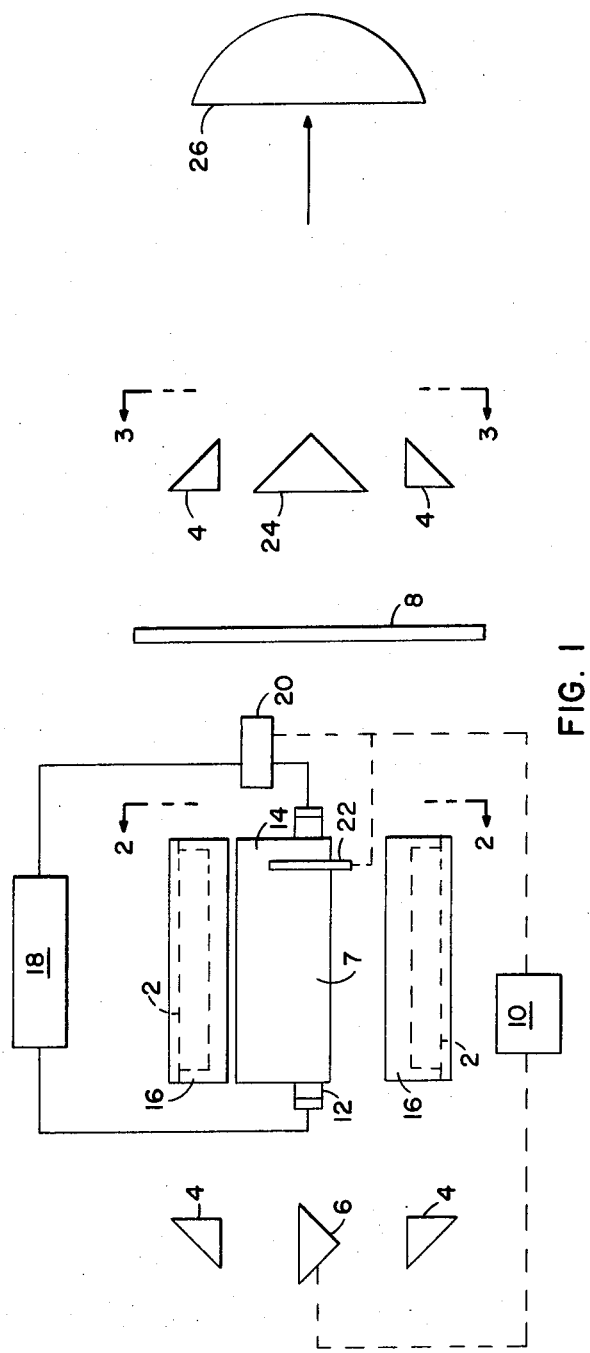
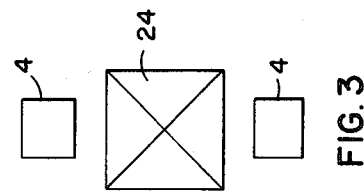
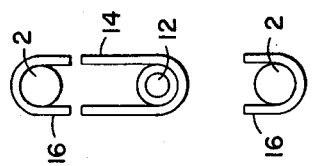

MULTI-ROD SINGLE PUMP SOURCE LASER

DEDICATORY CLAUSE

The invention described herein may be manufactured, used, and licensed by or for the Government for governmental purposes without the payment to me of any royalty thereon.

BACKGROUND OF THE INVENTION

Many applications of lasers require that the laser rods be pumped at a rapid rate. Repeated pumping of laser rods causes them to overheat and cease to lase. It is possible to pump the laser rods rapidly for a few cycles, wait until the rod cools, and then repeat the pumping; however, this does not give a continuous pulsed output. Devices housing a multiplicity of laser rods which are pumped in sequence are available; however, they are very complex in their construction and lack the simple structure of this invention.

Accordingly, it is an object of this invention to provide a device for obtaining a continuous rapidly pulsed laser output.

SUMMARY OF THE INVENTION

Laser rods are available which can achieve a fire rate of 20 cps. By placing two of these rods adjacent, controlling the pumping rate of each rod, and directing the output laser along a common axis, a device is produced which has a fire rate of 40 cps. In the present invention a laser array is formed by a plurality of laser rods arranged in a circular configuration with their longitudinal axes parallel. The rods are pumped in sequence by a single optical pump and the output laser pulses are guided by optical means to a particular target. The present invention provides a continuous series of laser pulses as an output. The pulse frequency is dependent only on the number and fire rate of the rods used.

BRIEF DESCRIPTION OF THE DRAWING

FIG. 1 is a schematic side view of the present invention;

FIG. 2 is a partial end view of FIG. 1 taken about line 2—2;

FIG. 3 is a partial end view of FIG. 1 taken about lines 3—3.

DESCRIPTION OF THE PREFERRED EMBODIMENT

Referring to FIG. 1, laser rods 2 are arranged in a circular configuration about lamp 12, with their longitudinal axes parallel. Only two rods are shown, to simplify the drawing, although more rods could be used. Right prisms 4 are positioned at either end of rods 2. The prisms are orientated to bend the laser beam 90°. This requires that one leg of the right prism be normal to the path of the laser. Light entering normal to one leg of the prism strikes the hypotenuse of the prism and is reflected out normal to the other leg of the right prism.

Totally internal reflecting (TIR) prism 6 and a conventional multi-layered dielectric reflector 8 form the ends of an optically resonant Fabry-Perot cavity. The dielectric is constructed to be partially transmitting, partially reflecting and resonant at the wavelength of the laser beam. This wavelength is dependent on the lasing material used for rods 2. The laser energy is reflected between dielectric 8 (a Fabry-Perot plate) and TIR prism 6 by way of right prism 4. As each rod 2 is pumped, motor 10 positions TIR prism 6 so that its hypotenuse faces in the direction of the right prism 4 associated with the rod being pumped. TIR prism 6 rotates about an axis parallel to its hypotenuse and to the central axis of the laser array formed by laser rods 2. Prism 6 is transiently used to complete an optically resonant cavity for each rod.

Referring to FIG. 2, laser rods 2 are pumped by lamp 12. Lamp reflector 14 rotates about lamp 12. As the lamp reflector 14 lines up with the rod reflector 16, the lamp 12 pumps the laser rod 2. The timing of the rotating lamp reflector 14, the optical pumping by lamp 12, and the rotation of TIR prism 6 are sequenced for proper Q-switching of each rod in the array during each revolution of lamp reflector 14. The speed of the rotating reflector 14, TIR prism 6, and pumping of lamp 12 are adjusted to obtain a particular output pulse rate from the array. Power is supplied to lamp 12 by power source 18.

The sequencing of lamp reflector-, optical pump 12, and prism 6 is achieved through conventional means. Motor 10 controls the rotation of prism 6 and further controls the rotation of lamp reflector 14 through a conventional gear box 22. The flashing of optical pump 12 is regulated by flasher control unit 20. The shaft of motor 10 is mechanically connected to the flasher control unit 20. The flasher control unit senses the angular position of the shaft and flashes the optical pump accordingly. A very simple means for doing this would be a commutator. The commutator would cause the lamp to flash every 180° for a two-rod array or, every 90° for a four-rod array. The rotational position of prism 6 and lamp reflector 14 relative to each other and the timing of the flashing of optical pump 12 are all selected to provide Q-switching of the laser rods forming the array. To obtain an output pulse from a rod, the rotating reflector 14 is aligned with the rod reflector 16, the lamp 12 is pulsed, and TIR prism 6 is brought into alignment to form a Fabry-Perot cavity.

Referring to FIGS. 1 and 3, the beams originating from rods 2 are directed onto front surface reflector 24 by right prisms 4. The number of sides on reflector 24 is determined by the number of rods 2 in the array. The beams are reflected from front surface reflector 24 through lens 26. Lens 26 is preselected for beam convergence at a desired distance from the device.

While a specific embodiment has been described in detail it is obvious that numerous changes may be made without departing from the general principles and scope of the invention. As an example, the flashing of lamp 12 relative to the position of reflector 14 and prism 6 could be controlled by optical means instead of mechanical means.

What is claimed is:

1. A multi-rod single pump source laser comprising: an optical pumping means; a plurality of rods comprising a quality of lasing material, said rods arranged in a circular configuration about said pumping means wherein the longitudinal axes of said rods and said pumping means are parallel; a Fabry-Perot plate reflector for forming in conjunction with each rod a portion of a Fabry-Perot cavity; reflecting means used transiently by each of said rods to form another portion of said cavity such that said rods undergo lasing action and produce a beam when transiently pumped by said pumping means; said optical pumping means comprising a lamp, a first U-shaped reflector rotatable about said lamp, a second U-shaped reflector disposed about each of said rods, means for transiently energizing said lamp to produce optical energy, and means for rotating said first reflector whereby said lamp is energized as the open end of said first U-shaped reflector aligns with the open ends of said second U-shaped reflectors; said reflecting means comprising a first right prism disposed at a first end of each of said rods, and a totally internal reflecting (TIR) prism rotatably disposed about an axis coincident with the axis of said pumping means such that the hypotenuse of said TIR prism is parallel to said axis, wherein said TIR prism optically aligns, as it rotates, with each of said rods by way of said first right prisms such that any light energy emerging from said rod is reflected by said first right prism into said TIR prism and from said TIR prism back to said rod by way of said first right prism.

2. A multi-rod single pump source laser as set forth in claim 1 to further comprise a second right prism at each second end of said rods and a regular pyramid having a plurality of sides equal in number to said plurality of rods, said Fabry-Perot plate being disposed between said right prisms and said second end of said rods, said second right prisms and said sides of said pyramid being optically aligned to bring said output beams closer together and to direct said output beams substantially along an axis parallel to said axes of said rods.

* * * * *